March 15, 1955     D. A. LYON     2,704,265
ELECTRICALLY CONDUCTING FILMS ON CAST PLASTICS
Filed April 27, 1951
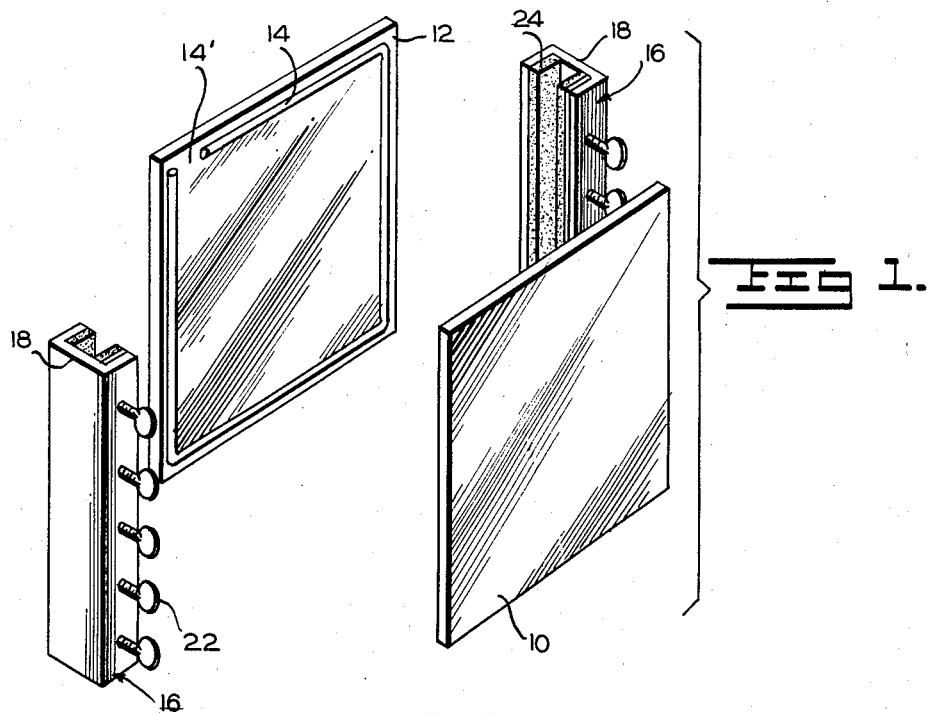
Fig. 1.
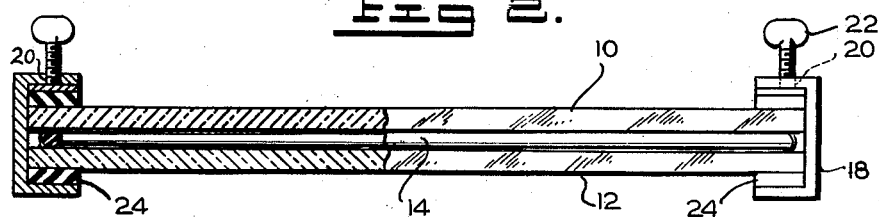
Fig. 2.
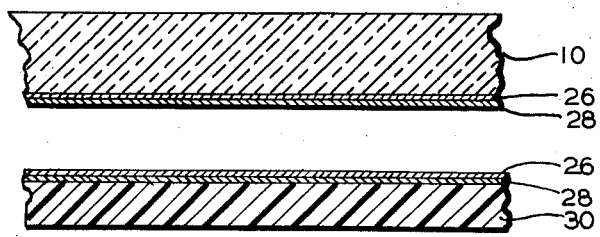
Fig. 3.
Fig. 4.
INVENTOR
DEAN A. LYON
BY Cushman, Darby & Cushman
ATTORNEY

United States Patent Office 2,704,265
Patented Mar. 15, 1955

2,704,265

ELECTRICALLY CONDUCTING FILMS ON CAST PLASTICS

Dean A. Lyon, Washington, D. C.

Application April 27, 1951, Serial No. 223,350

3 Claims. (Cl. 117—138.8)

This invention relates to the product formed and the process for forming an electrically conducting coating or film on the surface of a cast plastic material. The invention does not include within its scope plastic fibers, filaments, yarns, or plastic products produced by injection and extrusion molding.

More specifically, this invention relates to a new and novel process for bonding an electrically conducting film, preferably transparent but not necessarily so, to the surface of cast plastic so that the film is so thoroughly bonded to and imbedded in the surface of the plastic that it becomes in fact a part of the plastic surface. The cast plastic itself may be clear, colorless and transparent or it may have incorporated in it dyes, fillers, or pigments to produce color, translucency or other desired effects. As a specific example of the process of this invention for producing a transparent electrically conducting film on the surface of a transparent plastic there will be described a method for forming a film of cuprous iodide on a transparent flat sheet of polymerized methyl methacrylate.

The prior art does not provide any method for forming on a plastic surface a highly transparent coating or film which at the same time has considerable electrical conductance. More specifically, the prior art does teach that various solutions may be painted, sprayed or wiped upon the surface of the plastic in order to leave a thin transparent film which has sufficient conductance to dissipate static electricity. However, such coatings are only of temporary efficiency since they either evaporate, decompose or are easily removed by rubbing or by cleaning operations. Furthermore, the very slight electrical conductance of these prior art films arises from the absorption of moisture from the atmosphere, thereby providing a thin film which has a minute amount of ionic conductance. Generally, such films lose their conductance and become inoperative and ineffective in dissipating static electricity if they are dried at elevated temperatures or are placed in a vacuum. Furthermore, these films are usually made of complex organic materials which do not have the permanent and stable properties usually associated with inorganic materials. Very thin metallic films applied by vacuum evaporation may be made to have high electrical conductance but the light transmission is low because of metallic reflection and absorption losses. Furthermore, such films are fragile and are subject to oxidation unless the film is made of a noble metal.

An object of the present invention is to provide a process for forming on the surface of a cast plastic material, an electrically conducting non-metallic film having considerable conductance.

Another object of this invention is to provide a process for forming on the surface of a cast plastic material an inorganic non-metallic electrically conducting coating which is reasonably permanent and which retains its electrical conductance under vacuum conditions and/or in the absence of moisture.

A further object of this invention is to provide a process for forming on the surface of a transparent cast plastic material a transparent electrically conducting film having considerable conductance.

A still further object of this invention is to provide a process for forming on the surface of a cast plastic material, an electrically conducting coating so thoroughly bonded to and imbedded in the plastic surface that the plastic may be subjected to simple forming operations without destroying all conductance of the surface coating.

Another object of this invention is to provide a process for forming on the surface of a cast plastic an electrically conducting coating which will be perfectly effective in preventing the accumulation of static electric charges even though the coated plastic has been subjected to simple forming and bending operations.

Another object of this invention is to provide a process for forming on the surface of a cast plastic, an electrically conducting coating which will be perfectly effective as an electromagnetic shield which, if desired, may be subjected to simple forming and bending operations.

A further object of this invention is to provide a process for forming on the surface of a cast plastic, an electrically conducting coating which is rugged and will withstand scratching and abrading to the same extent as the cast plastic itself.

These objects and other objects will become apparent upon consideration of the following description taken in connection with the drawings wherein:

Figure 1 is an exploded view in perspective of one type of a cell or mold which may be used in the process of this invention for forming the products thereof;

Figure 2 is a plan view partly in section of the cell or mold of Figure 1 in assembled relation;

Figure 3 is a vertical cross-sectional view of one mold plate of Figure 1 including superimopsed films applied thereto prior to the casting of the plastic; and Figure 4 is a vertical cross-sectional view of a sheet of plastic coated with the electrically conducting film of this invention.

In my copending U. S. application Serial No. 185,051, filed September 15, 1950, and entitled Electrically Conducting Films and Process for Forming the Same, I have described methods for producing electrically conducting films of cuprous iodide upon various materials including plastics. The teachings of that application insofar as they relate to the methods for forming the conducting coatings of cuprous iodide are incorporated in the description of this invention.

The electrically conducting films which are preferably but not necessarily transparent and which are to be applied to castable plastics in accordance with this invention are of cuprous iodide and are made preferably by Method 1 of the above-identified copending application. It is to be understood, however, that Method 2 or 3 may be employed, if desired.

Method 1 of the aforesaid application comprises the application of a film of cuprous iodide to a surface, for example to a glass surface, by the steps of exposing the surface at substantially room temperature under substantially vacuum conditions to an atmosphere of copper vapor, and then exposing the resulting copper coated surface which is at a temperature not substantially exceeding room temperature to iodine vapor, the temperature of the iodine vapor not substantially exceeding 100° C.

Method 2 of the aforesaid application comprises exposing a surface of a material to cuprous iodide vapor under substantially vacuum conditions for a time sufficient to build up the required thickness of film.

Method 3 of the aforesaid application comprises depositing a copper coating on a surface of the material to be coated by immersing the surface in a chemical solution containing a soluble salt of copper and a reducing agent and then exposing the resulting copper coated surface to iodine vapor, the temperature of the iodine vapor not substantially exceeding 100° C.

In order to understand the present invention, it is necessary to explain briefly the essential steps in the usual procedure of casting a sheet of plastic from a liquid monomer, for example, methyl methacrylate. Although methyl methacrylate is used as an example, it is to be understood that essentially the same procedure is used in casting other types of plastics. Furthermore, it is to be understood that the sheet need not be clear and transparent since dyes, pigments and fillers may be incorporated into the monomer in order to produce color, translucency or other desired effects.

In order to cast a flat sheet of methyl methacrylate a mold made of two large flat and smooth plates which are held apart around the edges by a resilient rubberlike gasket or separator and a clamping arrangement for holding the plates and gasket in assembled position is used. The two large, flat and smooth plates forming the sides of the mold may be made of polished metal or plate glass but the latter is preferred since it has the necessary smooth polished surface and does not therefore require polishing as do metals. The rubber-like resilient gasket placed between the two plates near the periphery is continuous all the way around except for a small opening which is located at the top when the mold is placed upright with the large flat sides in vertical planes. The clamping arrangement on the outside of the mold squeezes the two plates together and compresses the resilient gasket so that a thin space is formed between the two glass plates into which liquid monomer may be poured through the opening which has been left in the gasket at the top of the mold. If the gasket is compressed sufficiently there will be no leakage between the gasket separator and the glass plates. The mold, filled with liquid monomer, is then heated in an air oven or water bath or other suitable means until the liquid monomer has polymerized into a solid sheet. When the polymerization has been completed the heating is discontinued and the mold permitted to cool. The solid plastic sheet will have but slight affinity for, or adherence to, the glass walls if polymerization is complete and will, therefore, separate from the glass mold sides when the mold is dismantled. The resultant sheet of solid plastic will have smooth surfaces which are as smooth as the glass against which they are cast.

The method described above is subject to many variations in commercial practice in order to produce the highest quality sheets and the description given here should be interpreted as a short summary of the main features of the process but inclusive of these commercial variations.

In order to accelerate the action of the heat in polymerizing the monomer, it is necessary to add to the monomer a small quantity of a catalyst. The catalysts that may be employed are usually of an oxidizing nature but non-oxidizing catalysts are known. The most generally used catalyst is benzoyl peroxide but many other satisfactory peroxides are commercially available.

In the drawings, Figure 1 represents the essential parts of a mold for casting a sheet of plastic from the monomer. It is to be understood that this is a simplified form of mold which has been actually used in perfecting this invention. However, other molds used in industry and of a more complicated nature may be employed for this invention.

Two large flat and smooth plates 10 and 12 form the sides of the mold of Figure 1 and as indicated are preferably made of plate glass. A resilient, solid or tubular, rubberlike gasket 14 which may be made, for example, of rubber or a synthetic resin inert to the monomer to be cast is placed between plates 10 and 12 and about the periphery thereof for separating these plates. Mold clamps 16 which, as shown, are small channel irons 18 having tapped holes 20 and tightening screws 22 are provided on the inner leg faces with cushioning gaskets 24. These mold clamps 16 are for the purpose of retaining the mold faces 10 and 12 in aligned position and sealed by the gasket or separator 14. An opening 14' between the ends of the gasket 14 allows the introduction of liquid monomer into the mold when the mold is in an upright position with the opening 14' at the top thereof as shown in Figure 1.

If rubber is used as the material for the separator or gasket 14, it should be covered with some material which is inert to the monomer to be cast since the rubber contains ingredients which are leached out by the monomer and these leached materials may discolor the monomer or inhibit its polymerization. A suitable covering material for a rubber separator may be made by dissolving polymerized polyvinyl alcohol in a 50-50 mixture of ordinary grain alcohol and water. A 7 per cent solution by weight of the polyvinyl alcohol in the water-alcohol mixture makes a liquid of such viscosity that a single layer coated on the rubber separator is usually sufficient but for assurance that there are no holes or breaks in the polyvinyl alcohol covering, two or three separate layers may be applied with time allowed for a layer to dry thoroughly before the next one is applied.

Generally, this invention comprises the discovery that an electrically conducting film of cuprous iodide may be formed upon a surface against which the plastic material is to be cast and then transferred to the surface of the polymeric material by polymerizing the liquid monomer in contact with the cuprous iodide film on the casting surface. As a result of this process, the film becomes thoroughly bonded to the plastic surface and becomes, in fact, a part of the same. When the mold is disassembled after polymerization has been completed, the film strips away from the casting surface and remains thoroughly bonded to or imbedded in, the plastic surface.

In carrying out this invention, a film of cuprous iodide 26 is formed on one of the inner surfaces of either of the mold plates 10 or 12 as shown in Figure 3 in accordance with the teachings of my above-identified copending application. It is, of course, apparent that if it is desirable to provide an electrically conducting cuprous iodide film on both sides of the cast plastic sheeting, a cuprous iodide film 26 will be first formed on both of the inner faces of mold plates 10 and 12. No effort should be made to thoroughly clean the mold surfaces prior to the formation of the cuprous iodide upon them because the success of the invention depends upon the fact that there must be practically no adherence between the cuprous iodide film and the base on which it is deposited. Thus, if the preferred Method 1 of the aforementioned application is used to form the cuprous iodide film, a simple wiping of the surface with a towel, cotton, or cloth is sufficient. A glow discharge in the vacuum chamber to further clean the plates should not be used because it may cause the cuprous iodide film to adhere so tightly that it will not strip off. A simple wiping with a towel leaves an invisible layer of probably a grease or oil on the surface which is sufficient to serve as a parting agent to prevent the iodide film from adhering to the mold surfaces. After the formation of the cuprous iodide film or films, the mold is assembled as described above, with the cuprous iodide film on the inner face of the mold plate. Liquid monomer containing a catalyst is then poured through the opening 14' to fill the mold and the monomer is polymerized by means of heat to form the polymerized plastic sheeting. Upon disassembling the mold, it is found that the cuprous iodide film as described above has been transferred to the polymerized plastic sheeting and firmly bonded thereto.

I have further discovered that it is impossible to polymerize a castable plastic monomer containing an oxidizing catalyst such as benzoyl peroxide in direct contact with the cuprous iodide film without producing a cloudy, milky product. It appears that the peroxide reacts chemically with the cuprous iodide film and destroys it. The products of this reaction cause the final plastic product to be milky. In order to circumvent this difficulty, it has been found necessary to interpose a thin protective coating of a clear transparent material between the cuprous iodide film and the monomer, so that direct contact of the monomer and the iodide film is prevented. This intermediate thin coating must be capable of forming a strong bond with the iodide film as well as the polymerized material, such as polymethyl methacrylate. The choice of this intermediate film is immaterial, so long as the film satisfies the bonding requirements mentioned above and does not introduce any undesirable color or other bad effects.

An example of a composition suitable for the intermediate protective film is a product of the Naugatuck Chemical Division of the U. S. Rubber Company known as "Clear PQL." According to information supplied by the manufacturer, this compound is an interpolymer of styrene, an allylic fumarate, and an allylic alcohol which is made in accordance with U. S. Patent 2,526,434 of October 17, 1950. As shown in Figure 3, "Clear PQL" is applied in a very thin coating 28 a fraction of a mil thick by brushing, spraying, dipping or flowing over the cuprous iodide film 26 and is then baked in an oven for about one hour at a temperature not less than 195° C. and preferably about 210° C. Treatment in this manner provides the iodide film with a hard and clear protective layer. It has been found, for example, that a 10% solution by weight of "Clear PQL" in xylene, benzene, toluene or any other suitable solvent is satisfactory for flowing on a protective layer for the cuprous iodide. A plate coated in this manner should be positioned horizontally and left in the air a sufficient time to permit the solvent to evaporate. It is then only necessary to place the same in an oven and bake, for example, for about one hour at a temperature of 210° C. The concentration, however, of "PQL" in the solvent is not critical and, regardless of whether brushing, spraying, dipping or flowing is used, the concentration should be adjusted so that a very thin film is obtained. A film of the correct thickness will show interference colors. If the film of "Clear PQL" is too thick, it will strip the cuprous iodide film from the plate and curl up when an attempt is made to bake it. If the film is too thin, then, of course, monomer reaches the cuprous iodide film and a milky product results as well as destruction of the cuprous iodide film. If the "Clear PQL" film has not been baked sufficiently to cure it thoroughly, then the monomer will attack it and cause it to strip from the mold surface when the monomer is polymerized.

After coating a glass plate of the mold with an iodide film by one of the methods as described in my aforementioned copending application and after applying and baking on the "Clear PQL" film in the manner described, it is possible to polymerize the monomer of methyl methacrylate with the aid of, for example, an oxidizing catalyst, benzoyl peroxide. If, however, a non-oxidizing type of catalyst which is inert to the cuprous iodide is used, it is unnecessary to protect the cuprous iodide film with the intermediate "PQL" protective layer and the monomer may be polymerized in direct contact with the cuprous iodide.

The following is a specific example including various temperatures and proportions of materials of the composition employed for providing a cast methyl methacrylate flat sheeting with an electrically conducting transparent cuprous iodide film. It is to be understood, however, that temperatures, times and proportions apply only to the particular example described herein and that any set of conditions generally employed in industry for polymerizing methyl methacrylate is satisfactory. Further, the particular manner of applying the protective film chemically inert to a peroxide catalyst, if the latter is employed is not critical for reasons set forth above.

*Example*

The example to be described is applicable to the casting of methyl methacrylate in a mold which consists of two glass plates 8" x 12" separated by a ⅛ inch rubber separator so that the finished sheet will be about ¼₆ inch thick. Either one or both of the inner sides of the two glass plates forming the sides of the mold are initially filmed with cuprous iodide to the desired thickness by any of the methods previously described in connection with my copending U. S. application Serial No. 185,051. If an oxidizing catalyst is to be used with the liquid monomer to be cast as is described hereinafter in connection with this specific example, it is next necessary to apply a protective film chemically inert to the oxidizing catalyst. This film as described hereinbefore may be of "Clear PQL" and should be applied in the manner also described hereinbefore.

The methyl methacrylate monomer as obtained from a manufacturer generally contains an inhibitor—such as hydroquinone—to prevent polymerization before the material is to be used. This inhibitor should be removed. I prefer to remove the inhibitor by simple distillation at atmospheric pressure through a fractionating column in accordance with well known chemical practice. However, the inhibitor can also be removed by shaking the monomer a few moments with a 10 to 50 per cent concentration by weight of sodium hydroxide in water. After standing for a short time, the aqueous hydroxide containing the inhibitor settles to the bottom and the clear monomer can be decanted and it is now ready for use.

A quantity of the purified monomer sufficient to fill the mold—in this case about 150 grams—is brought just to the boiling point and then heating is stopped. This operation removes air which is dissolved in the monomer and which, if not removed, causes bubbles in the finished sheet. As soon as boiling has stopped, the catalyst—benzoyl peroxide, for example—is added in the amount of .01 per cent by weight of the monomer (.0001 gram of catalyst per gram of monomer). The monomer containing the catalyst is now poured into the mold which has been preheated to 80° C. As soon as the mold has been filled, it is placed in an oven already heated to 80° C., where it remains for 1½ hours at the end of which time the oven temperature is reduced to 60° C. Heating at 60° C. continues for about 20 hours when the temperature is again raised to 80° C. for 1 to 2 hours. The mold is then removed from the oven and permitted to cool after which it is dismantled and the plastic sheet removed.

The product resulting from the general process described above comprises, as is illustrated in Figure 4 of the drawings in exaggerated detail, a cuprous iodide film 26, an intermediate protective layer 28 if employed, and a polymerized plastic sheeting 30, all bonded together into a homogeneous unit, and the individual constituents are indistinguishable one from the other. The only color of the product will be that which arises from interference of light within the thin iodide film in accordance with the teachings of my copending application, Serial No. 185,051. The surface of the plastic upon which the film is applied will be as smooth as the surface against which the article is cast and, as a result, objects viewed through a cast sheet of plastic will not be distorted. Furthermore, when the polymerized sheet is separated from the mold surface it will be found that the cuprous iodide film has been stripped completely from the mold surface and is now so thoroughly bonded to the plastic that it cannot be removed by rubbing or washing. The cuprous iodide film withstands scratching and abrading to the same extent that the plastic itself does. Furthermore, it will be found that the film is electrically conducting and electrical contact to it may be made by any of the methods described in the aforementioned copending application.

The resistance of the film will, of course, be a function of its original thickness and generally it may be said that the thicker the film the lower the resistance. Resistance per square of the films produced in accordance with this invention will be much higher than films of corresponding thickness made in accordance with the teaching of my copending application Serial No. 185,051. The higher resistance of the films produced in accordance with this invention can probably be explained as the result of plastic monomer or the "PQL" layer diffusing into minute interstices of the film and partially insulating one particle from the other. A one-half wave length film produced in accordance with the teaching of application Serial No. 185,051 and having a resistance of about 4,000 ohms per square generally will have a resistances of 15,000 to 50,000 ohms per square when applied to the surface of a cast plastic in accordance with this invention.

The great advantage of the films produced by this invention is their greatly increased durability and ruggedness as compared with films produced in accordance with the teaching of application Serial No. 185,051. The films produced in the aforementioned application were merely deposited upon the surface of the plastic with no appreciable bond strength. As a result any attempt to heat or bend the plastic coated in accordance with the aforementioned application produces visible cracking in the conducting film. Furthermore, such films could be scratched and rubbed off quite easily. Films produced in accordance with the process of this invention, on the other hand, have higher resistances but are so thoroughly bonded to the surface of the plastic that the latter may be heated to forming temperatures in the vicinity of 300° F. and then bent into various shapes without visibly breaking and tearing the cuprous iodide film. Although the resistances of the films increase upon forming and bending the plastic coated with these films these resistances are still much lower than those required for dissipation of static electricity. Consequently, the present invention is admirably suited to the production of transparent plastic products having transparent anti-static coatings on surfaces thereof, the products being capable of being formed and shaped within reasonable limits and still retaining their anti-static properties. In addition, the products of this invention are well suited for use as electromagnetic shields or electrostatic shields.

The foregoing description of this invention is for the purpose of illustration only and is not limiting to the scope of the invention which is set forth in the claims wherein I claim:

1. An integrally formed article having a continuous, molded smooth, transparent, outer surface of cuprous iodide, a layer of synthetic resin and a body of polymerized polymethyl methacrylate, said layer of synthetic resin bonding the cuprous iodide surface and the body.

2. A transparent integrally formed article having a continuous, molded smooth, outer surface of cuprous iodide, a layer of synthetic resin and a body of polymerized polymethyl methacrylate, said layer of synthetic resin bonding the cuprous iodide surface and the body.

3. An integrally formed article having a continuous, molded smooth, transparent, outer surface of cuprous iodide; a layer of an interpolymer of styrene, an allylic fumarate, and an allylic alcohol; and a body of polymerized polymethyl methacrylate; the interpolymer layer bonding the cuprous iodide surface and the body.

References Cited in the file of this patent

UNITED STATES PATENTS

| | | |
|---|---|---|
| 2,259,524 | Kistler | Oct. 21, 1941 |
| 2,328,525 | Egolf | Aug. 31, 1943 |
| 2,332,461 | Muskat | Oct. 19, 1943 |
| 2,346,483 | Goss | Apr. 11, 1944 |
| 2,428,600 | Williams | Oct. 7, 1947 |
| 2,429,420 | McMaster | Oct. 21, 1947 |
| 2,536,657 | Reese | Jan. 2, 1951 |